3,265,594
PROCESS FOR RECOVERING REFINED ETHYL ALCOHOL BY PLURAL DISTILLATION
Ronald A. De Jean and Ashley N. Beasley, Longview, Tex., assignors to Eastman Kodak Company, Rochester, N.Y., a corporation of New Jersey
Filed Jan. 4, 1963, Ser. No. 249,454
3 Claims. (Cl. 203—84)

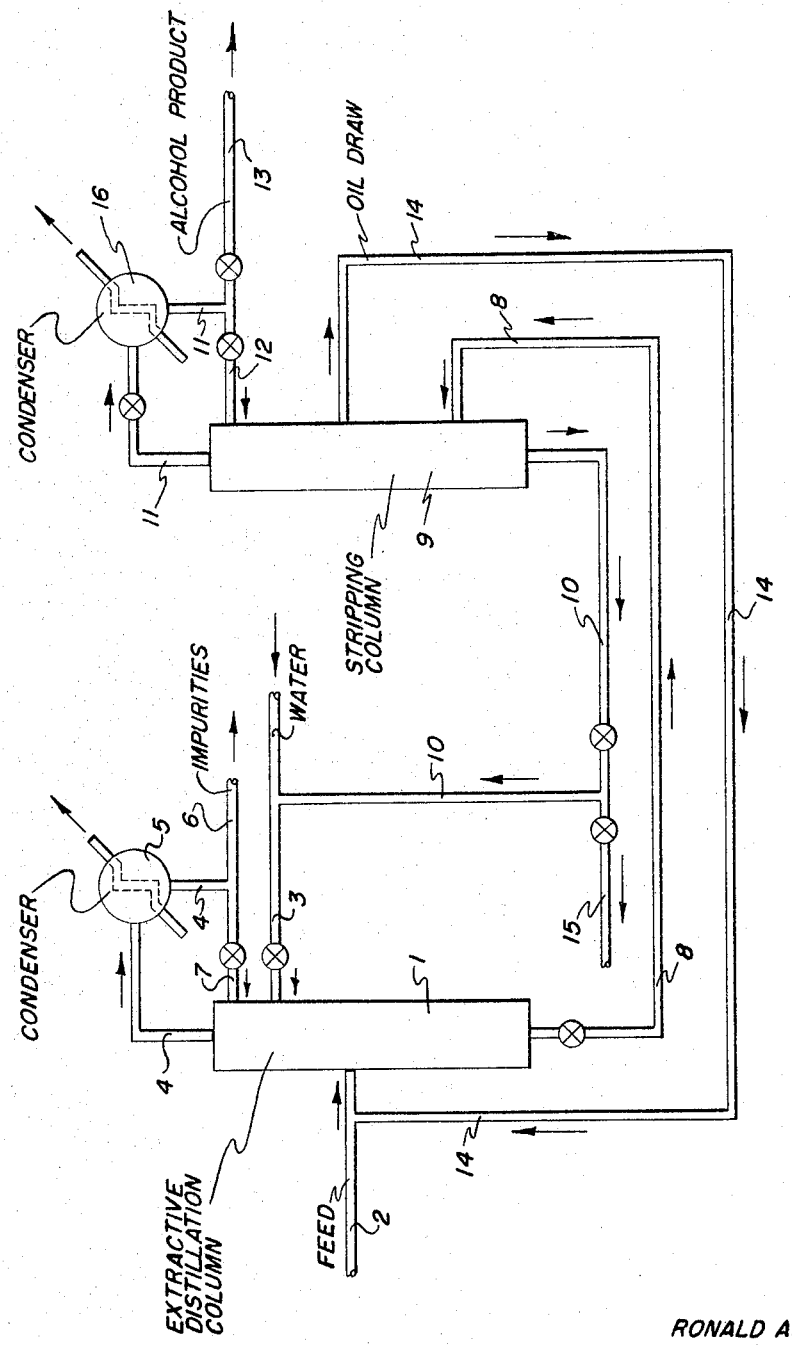

This invention relates to a process for purifying crude ethyl alcohol produced by the catalytic hydration of ethylene.

In the production of ethyl alcohol by the catalytic hydration of ethylene complex crude ethyl alcohol mixtures are produced which contain various impurities. The impurities include at least one other aliphatic alcohol, aliphatic aldehydes, aliphatic ketones and at least one aliphatic ether. The recovery of a marketable quality ethyl alcohol from such mixtures by ordinary distillation techniques is extremely difficult because of the tendency of the impurities to form binary and ternary azeotropes with ethyl alcohol, water and with each other, for example. Inasmuch as there is an increasing demand for high proof ethyl alcohol substantially free of impurities, such as 190-proof ethyl alcohol, for example, improved methods of recovering ethyl alcohol of the character just noted from the complex crude ethyl alcohol mixtures referred to hereinbefore are highly desirable.

The present invention provides an improved process for purifying crude ethyl alcohol produced by the catalytic hydration of ethylene. By means of the improved process of the invention high proof ethyl alcohol, such as 190-proof, for example, substantially free of impurities can be obtained. The ethyl alcohol obtained in accordance with the process of the invention meets SDA 29 specifications.

Crude ethyl alcohol mixtures that can be treated with advantage in accordance with the process of the invention include those obtained by hydrating ethylene in the presence of a polybasic mineral acid such as phosphoric acid or sulfuric acid or an acid such as benzenesulfonic acid which acts like a polybasic mineral acid insofar as the ethylene hydration reaction is concerned. The crude ethyl alcohol mixtures employed in the examples given hereinafter were obtained by hydrating ethylene in the vapor phase employing phosphoric acid impregnated upon a bed of calcined diatomaceous earth as the catalyst.

In accordance with the process of the invention, the crude ethyl alcohol mixture is subjected to extractive distillation with water in a distillation column. The water concentration must be at least 85 mole percent in the liquid phase throughout the extractive distillation column. The impurities are removed from the top of the extractive distillation column and substantially pure dilute aqueous ethyl alcohol is removed from the bottom of the extractive distillation column. The dilute aqueous ethyl alcohol is then fed to a stripping column and substantially pure 190-proof ethyl alcohol is recovered from the top of the stripping column. The bottoms from the stripping column are recycled to the top of the extractive distillation column to recover any organic material present therein. An "oil draw" in the upper portion of the stripping column is used to remove impurities which are not completely removed by the extractive distillation with water. The "oil draw" material is recycled to the extractive distillation column for redistillation. The "oil draw" material can be conveniently introduced into the extractive distillation column by combining it with the feed thereto. It can, of course, be separately introduced into the extractive distillation column, if desired. The compositions of two typical "oil draw" materials are given hereinafter. Secondary, butyl alcohol, which has a boiling point higher than ethyl alcohol, is the principal impurity present in the "oil draw" material.

The accompanying drawing illustrates a flow plan of apparatus for carrying out the process of the invention.

Referring to the drawing, 1 represents an extractive distillation column, such as a 60 plate column, to which the crude ethyl alcohol is introduced by means of line 2. Water is fed at a temperature of from about 60° C. to 80° C. through line 3 to the top or near the top of column 1. Preferably the water is introduced on the top plate of column 1. The amount of water introduced to column 1 is sufficient that the water concentration is at least 85 mole percent in the liquid phase throughout the extractive distillation column 1. The point of introduction of water to column 1 is always above the point of introduction of the crude ethyl alcohol to column 1.

Impurities present in the crude ethyl alcohol are removed from column 1 by means of line 4, condensed in condenser 5 and removed from the system through line 6. If desired, part of the condensate can be refluxed to the top of column 1 by means of line 7.

Substantially, pure dilute aqueous ethyl alcohol is removed from the bottom of column 1 by means of line 8 and continuously introduced to the lower portion of stripping column 9 for concentration therein. Stripping column 9 can be a 60 plate column, for example. We have found that in the case of a 60 plate stripping column the dilute aqueous ethyl alcohol is advantageously introduced on the twentieth plate from the base of the column. It can be introduced on a higher or lower plate, if desired. Bottoms from column 9 consisting essentially of water are recycled in whole or in part through lines 10 and 3 to the top of the extractive distillation column 1 to serve as water thereto and to recover any organic material present therein. Excess bottoms from column 9 can be removed from the system by means of line 15.

An oil draw is provided in the upper portion of the stripping column 9 to remove impurities, such as secondary butyl alcohol, for example, which are not completely removed by the extractive distillation with water. The oil draw is on a plate lower than that on which the ethyl alcohol is removed from the stripping column 9. The oil draw can be on the fortieth plate, for example, of a 60-plate column. The oil draw consists primarily of ethyl alcohol and a feature of this invention is the return of the oil draw material to the extractive distillation column 1 for recovery of the ethyl alcohol and for removal of the impurities contained therein. The temperature of the stripping column at the point where the oil draw is made ranges from about 79° C. to about 99° C. The oil draw fraction can be conveniently introduced into the extractive distillation column 1 by combining it with the feed thereto. By recycling the oil draw fraction to column 1, the heat it possesses is utilized in the purification process of the invention. If desired, the oil draw fraction can be separately introduced into the extractive distillation column, although, there appears to be no advantage in doing so. As shown in the drawing, the oil draw fraction is returned to column 1 by means of lines 14 and 2.

The oil draw is important because if this fraction was not withdrawn from the stripping column 9 the concentration of the impurities in column 9 would increase to such an extent that some impurities would leave the column through line 11 along with the desired ethyl alcohol and thereby lower the quality and purity of the ethyl alcohol product.

The desired ethyl alcohol product is removed in vapor form from the top of stripping column 9 through line 11 and condensed in condenser 16. Part of the purified ethyl alcohol is returned to the top of column 9 through line 12 and part is removed from the system through line 13. In large scale operation, the ratio of the ethyl alcohol returned to the top of column 9 through line 12 to that removed from the system through line 13 can be 3 to 1, for example. This ratio has been found to be advantageous. This ratio is subject to variation and it is to be clearly understood that the invention is not restricted to any particular ratio. A temperature of 78° C. is maintained at the top of the stripping column 9 throughout the stripping or concentration operation.

The temperature of the water entering column 1 through line 3 ranges from about 60° C. to 80° C. The temperature at the top of column 1 is maintained above 80° C. throughout the extractive distillation. The temperature of column 1 at the point of entry of the crude ethyl alcohol is maintained at about 84° C. A temperature of about 95° C. to about 97° C. is maintained at the bottom of column 1. The temperature at the bottom of column 9 is maintained at about 100° C.

The crude ethyl alcohol mixtures contain about 5 percent to about 10 percent of organic impurities, about 20 percent to about 35 percent water and about 60 percent to about 75 percent ethyl alcohol. (These percentages are by weight). The compositions of a number of crude ethyl alcohol mixtures that can be purified in accordance with the process of the invention are given hereinafter. The exact amount of the various impurities present will vary depending upon the conditions employed in the catalytic hydration process. The mole percent of water on the top plate of column 1 is maintained between 85 percent and 99 percent.

The following examples illustrate the purification process of the invention.

*Example 1*

A crude ethyl alcohol obtained by hydrating ethylene in the vapor phase employing phosphoric acid impregnated upon a bed of calcined diatomaceous earth as the catalyst and containing 75 percent ethyl alcohol, 20 percent water and 5% percent organic impurities (by weight) was continuously fed to an extractive distillation column having 60 plates, for example. Water at 70° C. to 80° C. was introduced as reflux on the top plate of the 60-plate column and contacted with the crude ethyl alcohol feed stream which was introduced at the middle of the column. A water to feed volume ratio of 5.6 to 1 and a reflux ratio of 24 to 1 were maintained throughout the extractive distillation. A total of 7.6 percent by volume of the feed to the column was obtained as overhead product from the distillation column. This overhead product contained nearly all the impurities present in the crude ethyl alcohol undergoing purification. The concentration of the water in the liquid phase on the top plate of the extractive distillation column was 95 mole percent. The temperature at the top of the extractive distillation column was maintained above 80° C.

Bottoms from the extractive distillation column consisting of substantially pure dilute aqueous ethyl alcohol were fed continuously to a stripping column where the ethyl alcohol was stripped from the water. The dilute aqueous ethyl alcohol was introduced on the twentieth plate from the base of the 60-plate stripping column. A reflux ratio of 9 to 1 and an overhead temperature of 78° C. were maintained on the stripping column. An "oil draw" on the fortieth plate was used to remove secondary butyl alcohol and other impurities not removed in the extractive distillation column. The "oil draw" fraction was recycled to the extractive distillation column for recovery of the ethyl alcohol contained therein and for the removal of the impurities contained therein. Bottoms from the stripping column were recycled to the extractive distillation column to serve as feed water thereto and to recover any organic material not removed therefrom. The overhead product from the stripping column was 190-proof ethyl alcohol substantially free of impurities.

The following tabulation gives the composition of the streams at various points in the purification process of the invention. This tabulation applies to Example 1.

| Component | Percent by Weight | | | | |
|---|---|---|---|---|---|
| | Feed | Overhead from Column 1 | Feed to Column 9 | Product Alcohol | Oil Draw |
| Ethyl ether | 0.04 | 0.26 | | | ¹ 12 |
| Isobutyraldehyde | 0.22 | 0.68 | | | |
| Methyl Ethyl Ketone | 0.02 | 0.39 | | | ¹ 5 |
| t-Butyl Alcohol | 0.93 | 5.78 | | | ¹ 40 |
| C₅ Aldehyde | 0.10 | 2.94 | | ¹ 24 | |
| C₅ Ketone | 0.38 | 7.00 | | | |
| s-Butyl Alcohol | 3.51 | 43.66 | 0.014 | | 1.91 |
| Water | 19.68 | 24.51 | 94.23 | 5.56 | 27.98 |
| Ethyl Alcohol | 74.90 | 14.00 | 5.76 | 94.23 | 70.11 |
| Acetaldehyde | 0.22 | 0.70 | | 0.01 | ¹ 12 |
| Crotonaldehyde | | | | | 0.106 |

¹ Parts per million.

*Example 2*

A crude ethyl alcohol obtained by hydrating ethylene in the vapor phase employing phosphoric acid impregnated upon a bed of calcined diatomaceous earth as the catalyst and containing 60 percent ethyl alcohol, 34 percent water and 6 percent organic impurities (by weight) was continuously fed to an extractive distillation column having 60 plates, for example. Water at 78° C. was introduced as reflux at the top of the 60-plate column and contacted with the crude ethyl alcohol feed stream which was introduced at the thirtieth plate of the column. The vapor boil-up and reflux rate were carefully controlled in order to maintain the concentration of water in the liquid phase above 85 mole percent. The mole percent water for this run was actually calculated to be 95.7 percent. This was accomplished by feeding 5.6 volumes water per volume of the ethyl alcohol feed and maintaining a reflux ratio of 24:1 while removing 5.1 percent by volume of the ethyl alcohol feed as overhead product. The overhead product contains most of the impurities present in the crude ethyl alcohol. The temperature at the top of the extractive distillation column was maintained at 80° C. throughout the distillation.

Bottoms (substantially pure dilute aqueous ethyl alcohol) from the extractive distillation column were fed continuously to the twentieth plate from the bottom of a 60-plate stripping column. A reflux ratio of 9:1 and an overhead temperature of 78° C. were maintained on the stripping column throughout the stripping operation. An "oil draw" was provided on the fortieth plate to remove secondary butyl alcohol and other impurities not removed in the extractive distillation column. One and one-half percent of the feed was removed by this "oil draw." Bottoms from the stripping column were recycled to the extractive distillation column to recover any organic material not removed by the stripping operation and to serve as feed water. Heat is also recovered by recycling these bottoms to the extractive distillation column. 190-proof ethyl alcohol substantially free of impurities was recovered from the top of the stripping column.

The following tabulation gives the composition of the streams at various points in the purification process of the invention. This tabulation applies to Example 2.

| Component | Percent by Weight | | | | |
|---|---|---|---|---|---|
| | Feed | Overhead from Column 1 | Feed to Column 9 | Oil Draw | Alcohol Product |
| Hydrocarbons | [1]31 | 0.018 | — | [1]6 | [1]6 |
| Ethyl Ether | 0.078 | 0.71 | — | — | — |
| Isobutyraldehyde | 0.17 | 2.34 | — | — | — |
| Methyl Ethyl Ketone | 0.018 | 0.43 | — | — | — |
| t-Butyl Alcohol | 0.08 | 18.64 | — | — | — |
| Ethyl Alcohol | 59.81 | 13.79 | 5.70 | 91.91 | 95.13 |
| $C_5$ Aldehyde | 0.19 | 8.84 | — | — | — |
| $C_5$ Ketone | 0.77 | 17.75 | — | — | — |
| s-Butyl Alcohol | 4.05 | 9.51 | 0.343 | 1.02 | 4.79 |
| Water | 33.96 | 26.67 | 93.96 | 7.07 | [1]72 |
| Acetaldehyde | 0.16 | 1.30 | — | — | 0.071 |
| Crotonaldehyde | — | — | — | — | — |

[1] Parts per million.

From the foregoing it is seen that by the process of the present invention 190-proof ethyl alcohol substantially free of impurities is obtained from crude ethyl alcohol prepared by the hydration of ethylene in the presence of a polybasic mineral acid-acting acid as a catalyst. The process is especially directed to the purification of crude ethyl alcohol prepared by hydrating ethylene in the vapor phase employing phosphoric acid impregnated upon a bed of calcined diatomaceous earth as the catalyst.

The invention has been described in detail with particular reference to preferred embodiments thereof, but it will be understood that variations and modifications can be effected within the spirit and scope of the invention as described hereinabove and as defined in the appended claims.

We claim:

1. The process of purifying a crude ethyl alcohol prepared by the hydration of ethylene in the presence of a polybasic mineral acid-acting acid and wherein said crude ethyl alcohol contains about 5 percent to about 10 percent by weight of characteristic organic impurities including ether, aliphatic aldehyde, aliphatic ketone and aliphatic alcohol compounds and wherein secondary butyl alcohol is the principal individual organic impurity present, about 20 percent to about 35 percent by weight of water and about 60 percent to about 75 percent by weight of ethyl alcohol which comprises continuously feeding the crude ethyl alcohol to a fractional distillation zone at an intermediate point thereof, continuously adding water to the fractional distillation zone at a point substantially above that at which the crude ethyl alcohol is introduced to maintain an internal liquid reflux having a water content in the range of 85 to 99 mole percent throughout the liquid phase in the fractional distillation zone, distilling from said crude ethyl alcohol a vaporous mixture containing water and substantially all the organic impurities present in the crude ethyl alcohol wherein the overhead vaporous mixture distilled from the crude ethyl alcohol flows countercurrent to the aqueous reflux at temperatures above the boiling point of the alcohol, continuously withdrawing a dilute aqueous solution of ethyl alcohol substantially free of organic impurities but containing some secondary butyl alcohol from a lower point of said fractional distillation zone, rectifying the withdrawn aqueous ethyl alcohol in a second fractional distillation zone, removing from the top of said second fractional distillation zone refined ethyl alcohol of the order of 190-proof substantially free of organic impurities, removing a side stream consisting essentially of secondary butyl alcohol, ethyl alcohol and water from the upper portion of said second fractional distillation zone but at a point substantially below that at which the refined ethyl alcohol is removed and recycling said side stream to the first fractional distillation zone for redistillation therein.

2. Process according to claim 1 wherein the side stream containing secondary butyl alcohol, ethyl alcohol and water is introduced into the first fractional distillation zone by combining it with the crude ethyl alcohol feed thereto.

3. Process according to claim 1 wherein the polybasic mineral acid-acting acid is phosphoric acid.

References Cited by the Examiner

UNITED STATES PATENTS

| | | | |
|---|---|---|---|
| 2,080,111 | 5/1937 | Bump | 203—37 |
| 2,290,442 | 7/1942 | Metzel | 203—55 |
| 2,551,593 | 5/1951 | Gilliand et al. | 203—83 |
| 2,551,626 | 5/1951 | Morrell et al. | 203—85 |
| 2,647,078 | 7/1953 | Chambers | 99—34 |
| 2,806,816 | 9/1957 | Staib et al. | 203—83 |
| 2,828,249 | 3/1958 | Maze-Sencier et al. | 203—27 |
| 2,910,412 | 10/1959 | Muller et al. | 203—85 |

NORMAN YUDKOFF, Primary Examiner.

GEORGE D. MITCHELL, Examiner.

W. L. BASCOMB, Assistant Examiner.